United States Patent [19]

Koizumi et al.

[11] E Re. 31,341

[45] Reissued Aug. 9, 1983

[54] POLYTETRAFLUOROETHYLENE FINE POWDER AND PROCESS FOR PRODUCING THE SAME

[75] Inventors: Shun Koizumi, Toyonaka; Shigeru Ichiba, Kyoto; Tetsuo Shimizu, Toyonaka; Chuzo Okuno, Takatsuki; Tosinori Kadowaki, Suita; Katsutoshi Yamamoto, Settsu, all of Japan

[73] Assignee: Daikin Kogyo Co., Ltd., Osaka, Japan

[21] Appl. No.: 277,391

[22] Filed: Jun. 25, 1981

Related U.S. Patent Documents

Reissue of:

[64] Patent No.: 4,159,370
Issued: Jun. 26, 1979
Appl. No.: 850,539
Filed: Nov. 11, 1977

[30] Foreign Application Priority Data

Nov. 11, 1976 [JP] Japan ..... 51-135927

[51] Int. Cl.[3] ..... C08F 114/26

[52] U.S. Cl. ..... 526/73; 526/78; 526/255

[58] Field of Search ..... 526/73, 78, 255

[56] References Cited

U.S. PATENT DOCUMENTS

| | | | |
|---|---|---|---|
| 3,819,594 | 6/1974 | Holmes et al. | 526/255 |
| 3,945,985 | 3/1976 | Feiler et al. | 526/73 |
| 3,953,412 | 4/1976 | Saito et al. | 526/255 |
| 3,981,853 | 9/1976 | Manwiller | 526/255 |

*Primary Examiner*—Harry Wong, Jr.
*Attorney, Agent, or Firm*—Birch, Stewart, Kolasch & Birch

[57] ABSTRACT

Polytetrafluoroethylene fine powders which have an average molecular weight of not less than 5,000,000, preferably not less than 5,500,000, an amorphous index of not more than 0.1, preferably not more than 0.09, a number average primary particle size of 0.1 to 0.4 micron, preferably 0.15 to 0.38 micron, and a sharp endothermic peak at a temperature between 343° C. and 350° C. on the melting diagram by a differential scanning calorimeter, said sharp peak having an endothermic ratio of not more than 0.3, preferably not more than 0.27, and a half value width of the endothermic peak of not more than 8 degrees, preferably not more than 6 degrees, and a process for producing the polytetrafluoroethylene fine powders. The polytetrafluoroethylene fine powders have an excellent stretchability and are useful for electric wire coating, small diameter tubes, large diameter tubes, sealing tapes and the like.

12 Claims, 8 Drawing Figures

POLYTETRAFLUOROETHYLENE FINE POWDER AND PROCESS FOR PRODUCING THE SAME

Figure 1:
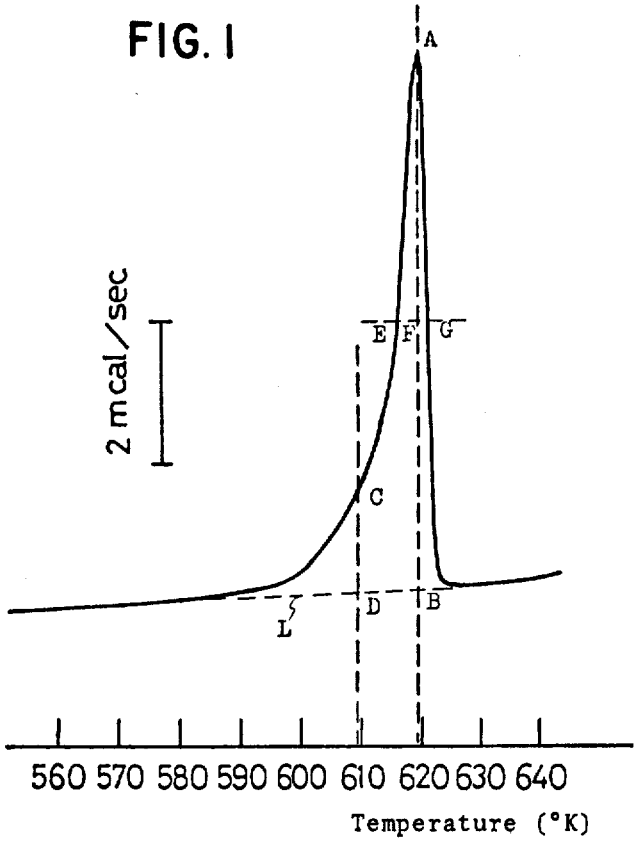

Matter enclosed in heavy brackets [ ] appears in the original patent but forms no part of this reissue specification; matter printed in italics indicates the additions made by reissue.

The present invention relates to novel polytetrafluoroethylene fine powders (hereinafter, referred to as "PTFE fine powders") and a process for producing the same.

PTFE fine powders are used for electric wire coating, small diameter tubes, large diameter tubes, sealing tapes and the like, and there are already many studies on the relationship between the PTFE fine powders and their processability. For example, PTFE fine powders suitable for electric wire coatings and small diameter tubes are such that they can be extruded at a high reduction ratio (a ratio of the cross section of the cylinder of an extruder to that of the nozzle of the extruder). Such PTFE fine powders are obtained almost satisfactorily by the techniques disclosed in U.S. Pat. No. 3,142,665, and U.S. Ser. No. 682,593. For large diameter tubes, PTFE fine powders that can be extruded at a low reduction ratio are suitable PTFE fine powders suitable for sealing tapes (unsintered tapes) are such that the tapes are hardly broken, corrugated or devitrified by the shearing force applied thereto during high-speed calendering. For such purpose, the PTFE fine powders that can be extruded at a high reduction ratio are not suitable. In this way, various types of PTFE fine powder having properties suitable for each of the various uses and processing conditions have been developed and used effectively.

Recently, a growing interest has been taken in the special application of PTFE to porous materials and some production methods have already been reported. For example, one typical example of the methods is disclosed in U.S. Pat. No. 3,962,153. This U.S. patent describes a process for producing porous materials having a matrix tensile strength of 514 kg/cm$^2$ or more by stretching a paste extrudate of PTFE fine powder, as it is unsintered, at a high speed of 10%/sec or more. This process is accomplished based on the discovery that the unsintered paste extrudate has a very unique property of beig highly stretchable, without being broken, at a high temperature and a very high stretching rate. The thus stretched PTFE is a porous material having a high tensile strength in the direction of stretching and a low apparent density, and it is used for various purposes as it is or after sintering.

An object of the present invention is to provide novel PTFE fine powders having excellent stretchability. Another object of the invention is to provide novel PTFE fine powders which are highly crystalline and have a high molecular weight. A further object of the invention is to provide a process for producing PTFE fine powders which are highly crystalline and have excellent stretchability and a high molecular weight. These and other objects of the invention will be apparent from the following disclosure.

As is disclosed in U.S. Pat. No. 3,962,153, when the unsintered paste extrudate of PTFE is stretched, the higher the stretching temperature, the less likely it is broken, and the higher the stretching rate, the greater is its stretchability without being broken. Thus, a stretching rate as high as 5,000%/sec to 4,000%/sec is occasionally applied. The stretchability (a property to be stretched without break) varies with the kind of starting PTFE fine powders. For example, a modified PTFE fine powder obtained by the process disclosed in U.S. Pat. No. 3,142,665 is poor in stretchability, and it is therefore necessary to stretch the powder at a higher speed and a higher temperature in order to obtain porous materials. Furthermore, it is known that the stretchability of PTFE fine powder tends to become better as the degree of crystallinity of the polymer constituting the fine powder becomes higher, and that the stretchability tends to be improved when the fine powder is previously subjected to heat treatment at a temperature between 200° C. and the melting point of the fine powder.

The PTFE fine powders according to the present invention are characterized in that they have an average molecular weight of not less than 5,000,000, more preferably not less than 5,500,000, an amorphous index (hereinafter, referred to as "A.I.") of not more than 0.1, more preferably not more than 0.09, and a number average primary particle size of 0.10 to 0.40 micron, more preferably 0.15 to 0.38 micron; and that, when their melting points are measured by a differential scanning calorimeter (hereinafter, referred to as "DSC"), they show melting diagrams wherein a sharp endothermic peak is observed at a temperature between 343° C. and 350° C., said peak having an endothermic ratio of not more than 0.3, preferably not more than 0.27, and a half value width of the endothermic peak of not more than 8 degrees, preferably not more than 6 degrees.

In the present invention, the average molecular weight ($\overline{Mn}$) is calculated by the following equation from the specific gravity (hereinafter, referred to as "S.G.") of the polymer:

$$\log_{10}\overline{Mn} = 28.524 - 9.967 \times S.G.$$

According to this equation, for example, the average molecular weight of 5,000,000 corresponds to S.G. of 2.19. In other words, the term "average molecular weight of not less than 5,000,000" used in the present specification has the same meaning as "S.G. of not more than 2.19". Likewise, "the average molecular weight of not less than 5,500,000" is the same as "S.G. of not more than 2.185"

The S.G. of the polymer can be measured in the following manner: A sample of the powder (5 g) is compressed in a mold having a circular section of a diameter of 32 mm under an atmospheric temperature of 23° to 25° C. and a pressure of 200 kg/cm$^2$, and the sample thus treated is taken out from the mold and sintered in an air furnace at a temperature of 380° C. for 30 minutes, cooled to 300° C. at a cooling rate of 70° C./hour, and then the sintered sample is taken from the furnace and allowed to cool at room temperature. The weight of the sample thus obtained is measured. [The S.G. is shown by the ratio of the weight of the sample in air to that of water having the same volume at 23° C.] *The S.G. is shown by the value obtained by multiplying the ratio of the weight of the sample in air to that of water having the same volume at 23° C. by 0.9822 and then adding 0.04864 to the resulting value.*

The A.I. in the present specification means the value calculated by dividing the absorbance of the polymer at a wave number of 778 cm$^{-1}$ by the absorbance at a wave number of 2367 cm$^{-1}$ in infrared spectrum.

The melting test by a DSC is carried out as follows: Ten milligrams of the unsintered PTFE fine powders are accurately weighed and placed in an aluminum pan, and the measurement for melting of crystal at the melting point is carried out using a highly sensitive DSC (DSC-II type, made by Perkin-Elmer Co., Ltd.). At this time, an endothermic peak owing to melting is recorded on the chart in proportion to heat of fusion at the melting point. The rate of rise of temperature should be accurately adjusted to 20° C./minute after the temperature becomes at least 80° C. lower than that at which the endothermic peak owing to melting appears. As is well known, the temperature at which PTFE crystals give an endothermic peak on the DSC chart and the shape of the peak are influenced by the rate of temperature-rise during the measurement (refer to, for example, Appl. Polymer Symposia, No. 2, 101-109 (1966)). The temperature of the endothermic peak and the shape of the peak thus measured delicately reflect the state of unsintered PTFE fine powder crystals.

According to the above measurement on DSC, PTFE has an endothermic peak at around of 347° C. The accompanying FIG. 1 shows the endothermic curve of the PTFE fine powder produced in Example 2 as described hereinafter, which is measured by DSC. It is clear from FIG. 1 that the powder has an endothermic peak at about 346° C. (619° K.).

The terms "endothermic ratio" and "half value width of the endothermic peak" used in the present specification are defined as follows:

In FIG. 1, a vertical broken line is drawn downward from the peak (A) and the cross point thereof with the base line (L) is named as (B). Besides, a line parallel with the vertical line is drawn at a temperature 10° C. lower than the temperature of top of the peak [i.e. 346° C. (619° K.)] and the cross points thereof with the endothermic curve and with the base line (L) are named as (C) and (D), respectively. Then, the value of $\overline{CD}/\overline{AB}$ is defined as the "endothermic ratio". Moreover, at the middle point (F) of the vertical line $\overline{AB}$, a line parallel with the abscissa axis is drawn and the cross points thereof with the endothermic curve are named as (E) and (G), respectively. The distance $\overline{EG}$, i.e. the width of the peak at half of the height from the base line of the endothermic curve, is defined as "half value width of the endothermic peak", which unit is shown in degrees.

The meanings of the above-mentioned properties of the present PTFE fine powders are explained below.

The PTFE fine powders of the present invention have an average molecular weight of not less than 5,000,000, more preferably not less than 5,500,000, usually in the range of 5,000,000 to 20,000,000. When the molecular weight is lower than 5,000,000, the stretchability of the fine powders is not good even though other requirements are satisfied. The value of A.I. should be not more than 0.1, more preferably not more than 0.09, usually in the range of 0.02 to 0.1. Higher A.I. values indicate the presence of more incomplete crystals of PTFE. When the value is more than 0.1, the fine powders become poorer in stretchability. The fine powders having a number average primary particle size of less than 0.1 micron are not suitable for processing, because they induce rise of a pressure under which the PTFE paste is extruded. On the other hand, the fine powders having a number average primary particle size of more than 0.4 micron are also undesirable because the extrudate shows a low strength.

The PTFE fine powders of the present invention have an endothermic peak of melting of the crystals measured by DSC at a temperature between 343° C. and 350° C. When a PTFE fine powder has the endothermic peak at a temperature out of the above range, it is not included in the fine powders of the present invention. In most fine powders of the present invention, the endothermic peak appears at a range of 345° to 349° C. Some fine powders occasionally show two peaks, and in such a case, the higher peak is defined as endothermic peak. The higher the molecular weight of the polymer, the higher the temperature of the endothermic peak. Taking into consideration this fact, the PTFE fine powders of the present invention are among the highest molecular weight polymers. Moreover, the present PTFE fine powders are characteristic in that the endothermic peak measured by DSC is very sharp. That is, the sharp peak has an endothermic ratio of not more than 0.3 and a half value width of the endothermic peak of not more than 8 degrees. When a PTFE fine powder does not satisfy the conditions of the endothermic ratio and the half value width of the endothermic peak as mentioned above, it does not show good stretchability of tape, even though the powder has an endothermic peak at 343° to 350° C. and other properties thereof are within the required ranges. These relationships found by the present inventors between the DSC chart and the stretchability of paste extrudate are very interesting.

Figure 2:
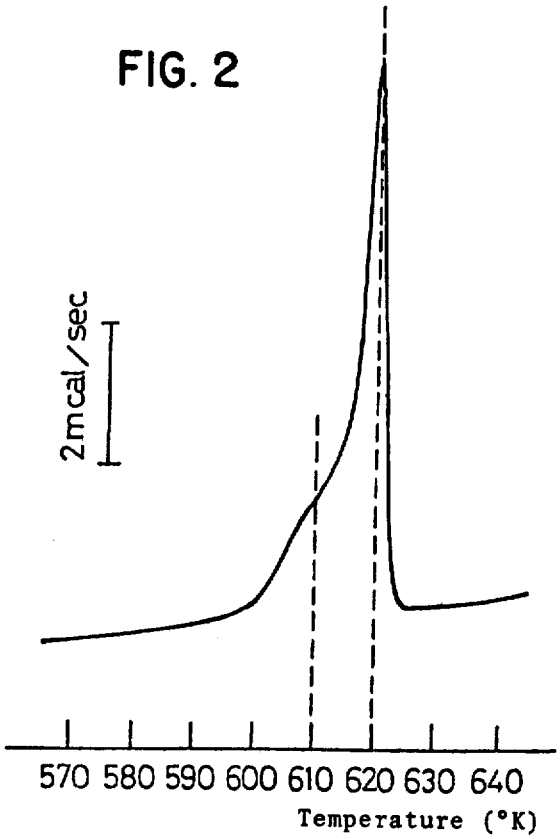
Figure 3:
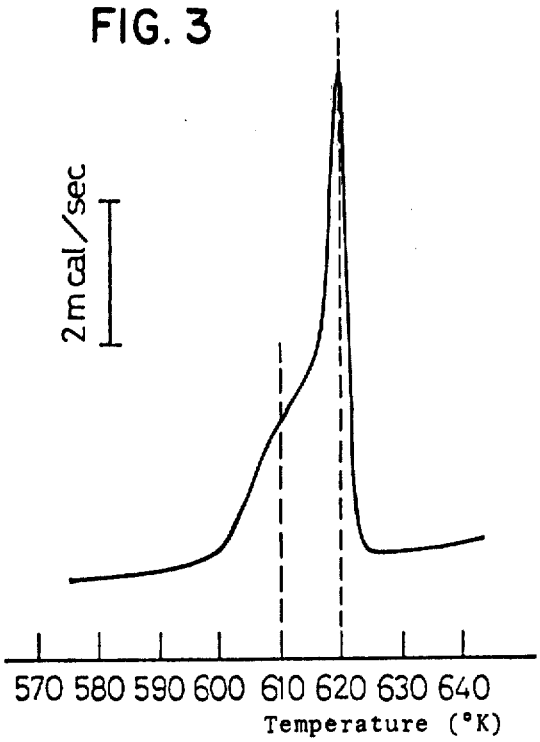
Figure 4:
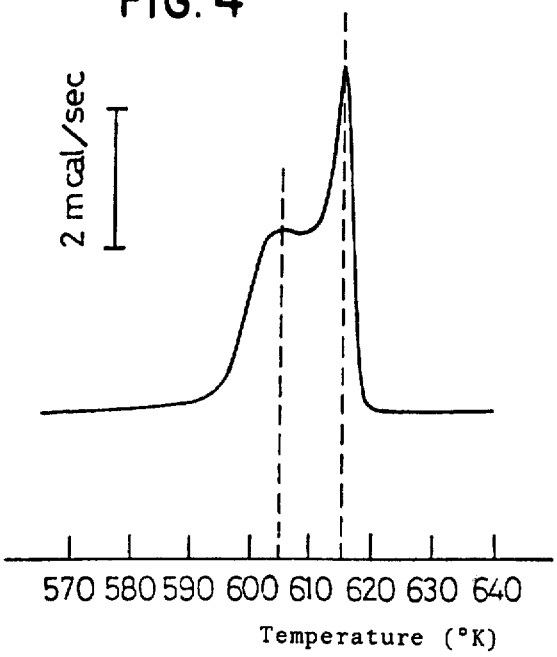

FIGS. 1 to 4 show an example of the DSC chart of the PTFE fine powders in the Examples and reference Examples. All these DSC charts show only a region between about 310° C. (583° K.) and about 370° C. (643° K.) wherein an endothermic peak appears, the abscissa indicating a temperature (absolute temperature: °K.) and the ordinate indicating a quantity of heat absorbed per unit time (mcal/sec). Vertical broken lines are drawn passing the endothermic peak and the temperature 10° C. lower than said peak. FIGS. 1 and 2 show the DSC chart of the powder satisfying the requirements of the present invention. As is clear from these charts, the endothermic peak is very sharp and has an endothermic ratio of not more than 0.3 and a half value width of the endothermic peak of not more than 6 degrees. FIGS. 3 and 4 show the DSC chart of the powder as disclosed in Referenced Examples 1 and 2, and any of them does not satisfy either or both of the requirements of the endothermic ratio and the half value width of the endothermic peak. As is clear from the comparison of FIGS. 1 and 2 of the present fine powders and FIGS. 3 and 4 of the powders in reference, in case of the powders of reference, a clear shoulder or another peak appears at a temperature about 10 degree lower than that of the endothermic peak, but on the contrary, in case of the powders of the present invention, such a clear shoulder does not appear, which is one of the characteristics of the present PTFE fine powders.

FIGS. 5 to 8 show the DSC chart of various commercially available PTFE fine powders. In these commercial products, neither shoulder nor other peak appears at a temperature about 10 degrees lower than that of the endothermic peak, and the endothermic ratio is low in all products. But, all these products have a half value width of the endothermic peak of more than 6 degrees, and in case of FIGS. 5 and 8, the temperature of the endothermic peak is lower than 343° C. (616° K.). Thus, these commercial products do not satisfy the requirements in the present invention in regard to the above matters, and are all inferior in the stretchability of tape.

Since the PTFE fine powders of the present invention have all the excellent properties as mentioned above, they are superior to the commercial fine powders in the mechanical properties of tubes or tapes produced by extrusion molding thereof, in addition to the superior stretchability as described above. Particularly, the present PTFE fine powders are characterized by a high resistance to repeated bending.

The PTFE fine powders of the present invention can be produced by polymerizing tetrafluoroethylene in an aqueous medium in the presence of an anionic surface active agent, dispersion stabilizer and polymerization initiator at a polymerization temperature of 55° to 85° C., with changing the polymerization conditions after the initiation of the polymerization and after the polymer in an amount of at least 25% by weight, more preferably 30% by weight, of the final yield has been produced but before at most 85% by weight, preferably at most 80% by weight, of the final yield of the polymer has been produced, said changing of polymerization reaction being carried out by at least one method of adding an alkali or a radical scavenger or both to the reaction system, and lowering the polymerization temperature at least 5° C.

As the anionic surface active agent, there may be exemplified water-soluble fluorine-containing surface active agents, for example, compounds of the formulae: $X(CF_2)_nCOOH$ (wherein X is hydrogen, chlorine or fluorine atom and n is an integer of 6 to 12) or $Cl(CF_2CFCl)_nCF_2COOH$ (wherein n is an integer of 2 to 6), and salts thereof. These surfactants may be used in an amount of about 0.05 to 0.5% by weight based on the weight of the aqueous medium.

As the polymerization initiator, a water-soluble persulfate (e.g. ammonium persulfate, potassium persulfate) or a mixture thereof with a water-soluble aliphatic dibasic carboxylic acid perioxide (e.g. disuccinic acid peroxide, diglutaric acid peroxide) is generally used. The polymerization initiator may preferably be used in a relatively low concentration, because such a low concentration gives a desirable effect on the stretchability of the extrudate and further it is difficult to produce a polymer having a high molecular weight when a too high concentration of the initiator is used. That is, the water-soluble persulfate is preferably used in a concentration of 0.002% by weight or less, more preferably 0.001% by weight or less, practically in the range of 0.0001 to 0.002% by weight, regardless of whether it is used alone or in a combination of the aliphatic dibasic carboxylic acid. The aliphatic dibasic carboxylic acid peroxide is preferably used in a concentration of 0.01% by weight or less.

Suitable examples of the dispersion stabilizer are hydrocarbons having 12 or more carbon atoms which are present in the liquid form under the polymerization condition.

All the compounds described above are generally used in the polymerization of tetrafluoroethylene and are easily available.

The polymerization reaction in the present invention should be carried out at a polymerization temperature of 55° to 85° C. Higher polymerization temperature than 85° C. induces too rapid decomposition of the catalyst and hence is not suitable for the polymerization in the present invention wherein a small amount of a catalyst is used. On the other hand, when the polymerization temperature is lower than 55° C., the decomposition of the catalyst is too slow, and hence, the polymerization reaction does not proceed at a sufficient rate. The polymerization can be carried out under a pressure of 5 to 20 kg/cm$^2$, preferably 5 to 10 kg/cm$^2$.

As mentioned above, the polymerization condition is changed after the initiation of polymerization by any one of the methods as mentioned above. When the polymerization condition is not changed, the produced PTFE has a too low molecular weight or a too broad endothermic peak in melting of the crystal measured by DSC, and the desired PTFE fine powder having an excellent stretchability can not be obtained. These methods for changing the polymerization condition are explained below in more detail.

One of the methods comprises adding an alkali to the reaction system. Suitable examples of the alkali are ammonium hydroxide, sodium hydroxide, or potassium hydroxide, which are preferably used in an aqueous solution. The alkali is used in such an amount that the polymerization system is kept in an alkaline side, particularly in a pH range of 8 to 10. Thus, the amount of the alkali should be determined in accordance with the pH value of the reaction system, the kinds and amounts of the used polymerization initiator, use of buffer, or the like, and the suitable amount thereof will readily be determined experientially or by a provisional test. For example, when a persulfate such as ammonium persulfate or potassium persulfate is used as the polymerization initiator, the pH value of the polymerization system is usually rapidly lowered to about 3 to 4, while the pH value before the initiation of the polymerization reaction lies in about 6 to 7, but according to the present invention, the pH value is changed to 8 to 10 by addition of an alkali. When an alkali is added, the rate of polymerization is lowered in comparison with the case of no addition of alkali, but the lowering of the rate of polymerization is slower in comparison with that which occurs at the middle of the reaction step or by addition of a radical scavenger. That is, when an alkali is added to the polymerization system, the pH value in the system is rapidly increased to 8 to 10, but the reduction of the rate of polymerization is gradually attained.

The second method for changing the polymerization condition comprises adding a radical scavenger which is effective on radicals in the aqueous phase. Suitable examples of the radical scavenger are ammonium thiocyanate ($NH_4SCN$), potassium thiocyanate (KSCN), sodium thiocyanate (NaSCN), cupric chloride ($CuCl_2$), or the like. Addition of an excess amount of the radical scavenger unfavorably deteriorates the stability of the dispersion, and hence, the radical scavenger is preferably used in an amount of about 2 to 5 times by weight to the amount of the polymerization initiator in order to obtain the desired PTFE fine powders.

The above alkali and radical scavenger may be used either alone or together.

The third method for changing the polymerization condition comprises lowering the polymerization temperature at least 5° C., preferably at least 10° C. This can be carried out by changing the pre-set temperature of an automatic temperature controller provided for controlling the temperature of the reaction vessel. When the temperature of the controller is changed, the temperature in the reaction vessel is not immediately changed but is rather delayed. However, it is enough that the change of temperature is completed before the polymer of about 80% by weight of the final yield has been produced, and hence, it is not so difficult to control the temperature. When the change of the reaction temperature is less than 5° C. the desired PTFE fine powder having excellent properties can not be obtained. On the other hand, when the temperature is changed more than 30° C., the reaction system becomes unstable, which induces unfavorable coagulation of the dispersion.

The change of the polymerization condition as mentioned above should be done at the time after the polymer of at least 25% by weight, preferably at least 30% by weight, of the final yield has been produced, but before the polymer of at most 85% by weight, preferably at most 80% by weight, of the final yield has been produced. It is known that the emulsion polymerization of tetrafluoroethylene proceeds in two reaction stages; the first stage wherein the nuclei of the polymer particles is mainly formed and the second stage wherein the particles mainly grow. When the polymerization condition is changed at the first stage of the polymerization which is a nucleus-forming stage, the reaction system becomes undesirably unstable. On the other hand, when the polymerization condition is changed after the polymer of more than 85% by weight of the final yield has been produced, the desired PTFE fine powder having excellent properties can not be obtained.

Generally, in emulsion polymerization of tetrafluoroethylene, the rate of polymerization increase with the lapse of time, if a polymerization initiator is used in a comparatively low concentration and the reaction temperature is fixed so that the half life time of the polymerization initiator becomes comparatively long, and further, if the temperature and monomer pressure are maintained constant during the polymerization. This may occur due to the following reasons: the polymer radical produced by the reaction of tetrafluoroethylene with a radical resulting from decomposition of the initiator is comparatively hardly deactivated throughout the polymerization wherein the particles of the polymer are formed, and the particles adsorb the radicals successively produced by the same mechanism, as a result of which the number of the radical in the whole reaction increases with the lapse of time.

On the other hand, the rate of decomposition of the initiator is largely influenced by the pH value and temperature of the system, and it becomes larger with lowering of the pH and with rise of the temperature. In emulsion polymerization of tetrafluoroethylene, when the polymerization is performed at a constant temperature and under a constant monomer pressure using the above-mentioned polymerization initiator, the pH of the system is lowered gradually unless any pH regulator is added, and the rate of decomposition of the initiator tends to become large. As a result, the overall rate of polymerization of tetrafluoroethylene is accelerated.

Addition of alkali and/or lowering of polymerization temperature in the course of polymerization induce slowdown of the rate of decomposition of the undecomposed initiator remained in the system, and limit the number of the polymer radicals successively produced. As a result, the rate of polymerization is slowed down compared with the case when the polymerization condition is not changed. Ammonium thiocyanate, potassium thiocyanate, sodium thiocyanate and cupric chloride act as a radical scavenger in an aqueous phase. When the radical scavenger is added, the radicals produced after the addition thereof are arrested and deactivated, as a result of which the rate of polymerization is slowed down. Accordingly, the radical scavenger is also effective for inhibiting the successive production of polymer radicals.

The aqueous dispersion of polymer thus obtained is subsequently coagulated, washed and dried by an ordinary after-treatment procedure, and thereby, the desired PTFE fine powders are produced.

The PTFE fine powders of the present invention thus obtained achieve a high molecular weight and a high crystallinity. Further, the PTFE seems to have a narrow distribution of molecular weight, because the radicals successively produced in the course of polymerization are limited. In fact, the melting diagram of the present PTFE fine powders on the DSC chart suggests the narrow distribution of molecular weight.

The PTFE fine powders according to the present invention can be subjected to various after-treatments, for example, to heat treatment at 300° C. or lower, and the kneading or pulverizing treatment as disclosed in Japanese Patent Publication No. 4657/1971. By these treatments, the melting diagram is changed very little and the stretchability is generally improved.

The PTFE fine powders of the present invention may contain fillers, such as powdered glass fiber, carbon powder, graphite powder, inorganic pigment powder or the like. In producing the PTFE fine powders containing such fillers, it is desirable to blend the fillers and the polymer at the coagulation step of the polymer dispersion obtained by polymerization. The PTFE fine powders thus obtained have also a good stretchability.

The present invention will be illustrated by the following examples. In the examples, percentage indicating a concentration and a weight ratio are by weight, unless otherwise stated.

The extrusion test and stretching test are carried out as follows:

Extrusion test:

100 parts by weight of the PTFE fine powder and 20 parts by weight of a liquid lubricant (Isopar E, a tradename of Esso Standard Oil Co.) are mixed at room temperature, and the mixture is stored for 12 to 24 hours in a tightly sealed container. The mixture is then extruded into filament at room temperature at a ram speed of 20 mm/min on an extrusion mold (inside diameter of cylinder, 25.4 mm; die angle, 30°; nozzle diameter, 2.54 mm; nozzle length, 7 mm). In this extrusion test, an extrusion pressure at the equilibrium state is recorded. The filament is then dried.

Stretching test:

A test sample for stretching test is prepared by cutting the filament obtained in the extrusion test. The sample is stretched at 310° C., with a distance between chucks of 50 mm, to 20 folds as long as its original length, at a varying stretching rate of 100 %/sec, 1000 %/sec and 1000 %/sec. The sample which can be stretched to 20 folds as long at a stretching rate of 100 %/sec is not also broken at the other two rates, and therefore it may be judged to have the highest stretchability. On the other hand, the sample which is broken at a stretching rate of 10000 %/sec is also broken at the other two rates, and therefore it may be judged to have the lowest stretchability.

EXAMPLE 1

To a 3-liter glass-lined autoclave equipped with a stirrer were added 1.5 liter of an ion- and oxygen-free water, 60 g of paraffin wax (m.p. 56° C.) and 2 g of ammonium perfluorooctanoate. The atmosphere in the autoclave was replaced with nitrogen gas several times at 70° C., and tetrafluoroethylene (hereinafter, referred to as "TFE") was charged under pressure until the inner pressure became 8.0 kg/cm$^2$G. Thereafter, 5 mg of ammonium persulfate (hereinafter, referred to as "APS") was added and polymerization was stated. The pressure in the autoclave began to drop as the polymerization started. When the pressure dropped to 7.0 kg/cm$^2$G, TFE was charged again under pressure until the pressure became to 8.0 kg/cm$^2$G. Thereafter, this cycle of pressure-drop and TFE-charge was repeated with the process of the reaction, and the polymerization was stopped 5 hours and 10 minutes after the initiation of the polymerization. In the course of the polymerization, when 0.8 ml of 28% aqueous ammonia was added to the reaction system about 3 hours after the initiation of polymerization, the apparent rate of polymerization which slowed a tendency to increase prior to addition of the aqueous ammonia showed a tendency to slightly decrease. The pH value of the reaction system was checked by sampling the reaction mixture in the system. As a result, the pH value of the system was 4.1 before the addition of the aqueous ammonia, but became 10 when the aqueous ammonia was added, and the pH value was kept at about 10 without lowering until the polymerization finished. Besides, it ws confirmed by sampling that the polymer of 51% by weight of the final yield was produced before the addition of the aqueous ammonia. The average rate of polymerization was 47 g/liter per hour throughout the whole polymerization period. The PTFE dispersion thus obtained had a concentration of 20.9% and an average particle size of 0.29 micron. This dispersion was coagulated, washed and dried at 120° C. for 16 hours to obtain the PTFE fine powder. This powder had an S.G. of 2.177, a molecular weight of 6,740,000 and showed an A.I. value of 0.089 by infrared absorption spectrum. The melting diagram in the vicinity of the melting point of this powder measured by DSC is shown in FIG. 2. This diagram has a sharp peak at 347° C. (620° K.) and a weak shoulder at 337° C. (610° K.), and the endothermic ratio is 0.21 and the half value width of the endothermic peak is 4.3 degrees.

Fifty grams of ths powder was mixed with 10 g of a liquid lubricant (Isopar E) and the mixture was stored in a tightly sealed container for 15 hours. Thereafter, the mixture was extruded into filament at a ram speed of 20 mm/min on a mold (inside diameter of ram, 25.4 mm; die angle, 30°; inside diameter of land, 2.54 mm; land length, 7 mm). The extrusion pressure at the equilibrium state was 182 kg/cm$^2$. The filament extruded was dried and, when subjected to the stretching test at 310° C., it could be stretched to 20 folds as long at a stretching rate of 100 %/sec to obtain a product having a uniform appearance.

EXAMPLE 2 to 4

Using the same equipment as in Example 1, polymerization was carried out in the same manner as in Example 1 except that the polymerization temperature was 65° C. in place of 70° C. and that aqueous ammonia was added at the times shown in Table 1. The properties of the resulting aqueous PTFE dispersions and PTFE powders are shown in Table 1. The melting diagram by DSC of the powder of Example 2 is shown in FIG. 1, and the powders of Examples 3 and 4 showed almost the same digram as in FIG. 2.

TABLE 1

| Ex. No. | Time of addition of aqueous ammonia* | Polymerization time | Polymerization rate (g/liter per hour) | Concentration of dispersion (% by weight) |
|---|---|---|---|---|
| 2 | 30 | 9 hr. 27 min. | 28 | 20.2 |
| 3 | 58 | 8 hr. 12 min. | 35 | 22.3 |
| 4 | 77 | 9 hr. 4 min. | 27 | 20.4 |

*This is shown by % by weight of the polymer based on the final yield which is produced before the addition of the aqueous ammonia

Reference Example 1

Using the same equipment and the same procedure as in Example 1, polymerization was started and continued for 6 hours without adding aqueous ammonia in the course of the polymerization. The rate of polymerization showed a slow increase, that is, the so-called acceleration tendency, throughout the whole polymerization period. The average rate of polymerization was 43 g/liter per hour. Besides, the pH value of the reaction system was 3.2 at the finish of the polymerization reaction.

The aqueous PTFE dispersion thus obtained had an average particle size of 0.27 micron and a concentration of 18.7%. This dispersion was coagulated, washed and dried to obtain a powder having properties as shown in Table 2. The melting diagram of this powder by DSC is as shown in FIG. 3 and it has a peak at 347° C. (620° K.) and a clear shoulder at 337° C. (610° K.)

The extrusion pressure in paste extrusion of this powder was 181 kg/cm$^2$. In the 20-fold stretching test at 310 C., the extruded filament was broken at a stretching rate of 100 %/sec and 100 %/sec. When the filament was stretched at a stretching rate of 10000 %/sec in the above test, it showed a surface having numberless, non-uniform cracks.

Reference Example 2

Polymerization was carried out at 90° C. using the same equipment as in Example 1. Required amounts of deionized water, paraffin wax and ammonium perchlorooctanoate, and 100 mg of disuccinic acid peroxide (a polymerization initiator, referred to as "DSP" hereinafter) were added.

After replacement with nitrogen gas, TFE was charged under pressure until the inner pressure became 8 kg/cm$^2$G, followed by stirring. 10 mg of APS was added 1 hour after the addition of DSP. The polymerization was substantially started at the time when APS was added, and a drop in presence was observed. When the inner pressure dropped to 7 kg/cm$^2$G, TFE was charged under pressure until the pressure became to 8 kg/cm$^2$G. Thereafter, the polymerization was continued while the cycle of pressure-drop and TFE-charge was repeated until the end of polymerization. The aqueous PTFE dispersion after polymerization had a concentration of 25%. This dispersion was coagulated, washed and dried to obtain a powder having properties as shown in Table 2. The melting diagram of this powder by DSC is as shown in FIG. 4 and it has a peak at 342° C. (615° K.) and another peak at around 332° C. (605° K.). The extrusion pressure in paste extrusion of this powder was 143 kg/cm$^2$, and the extruded filament was broken in the 20-fold stretching test at 10000 %/sec.

EXAMPLE 5

The emulsion polymerization of TFE was carried out in the same manner as in Example 1 except that 6 mg of potassium persulfate was used in place of APS as the polymerization initiator.

The PTFE dispersion thus produced had a concentration of polymer of 20.3%. The properties of the PTFE fine powder are shown in Table 2.

TABLE 2

| Example No. | S.G. | Molecular weight | A.I. | Average particle size (μ) | DSC analysis: Temp. of endothermic peak (°C.) | DSC analysis: Endothermic ratio | DSC analysis: Half value width of endothermic peak (degree) | Extrusion pressure in paste extrusion test (kg/cm²) | Stretchability |
|---|---|---|---|---|---|---|---|---|---|
| Example 2 | 2.174 | $7.17 \times 10^6$ | 0.084 | 0.32 | 346 | 0.19 | 5.3 | 160 | Stretchable at 100%/sec |
| Example 3 | 2.173 | $7.24 \times 10^6$ | 0.089 | 0.34 | 347 | 0.22 | 4.2 | 156 | The same above |
| Example 4 | 2.180 | $6.18 \times 10^6$ | 0.071 | 0.27 | 346 | 0.28 | 4.3 | 176 | The same above |
| Example 5 | 2.180 | $6.18 \times 10^6$ | 0.091 | 0.27 | 347 | 0.25 | 4.4 | 185 | The same above |
| Reference Example 1 | 2.190 | $5.00 \times 10^6$ | 0.067 | 0.27 | 347 | 0.31 | 4.5 | 181 | Broken at 1000%/sec |
| Reference Example 2 | 2.205 | $3.50 \times 10^6$ | 0.068 | 0.28 | 342 | 0.52 | 15 | 143 | Broken at 10000%/sec |

EXAMPLE 6

Emulsion polymerization of TFE was carried out at 70° C. using a 1.5-liter glass-made pressure vessel. The amounts of ion-free water, paraffin wax and ammonium perfluorooctanoate were half of those as in Example 1, but the amount of APS was 5 mg. The pressure of TFE was kept at 8 kg/cm²G to 7 kg/cm²G in the same manner as in Exampmle 1. When the yield of polymer reached 54% of the final yield, 20 mg of ammonium thiocyanate ($NH_4SCN$) was added. Thereafter, the rate of polymerization showed a tendency to decrease. The total polymerization time was 5 hours and 17 minutes, and the average rate of polymerization was 48 g/liter per hour. The PTFE dispersion had a concentration of 20% an average particle size of 0.23 micron, an S.G. of 2,186, a molecular weight of 5,370,000 and an A.I. value of 0.073. The melting diagram by DSC was almost the same as in FIG. 2, and it had a sharp peak at 347° C. (620° K. and no shoulder at a lower temperature region, and the half value width of the endothermic peak was 4.2 degrees and the endothermic ratio was 0.2. The pressure in paste extrusion was 145 kg/cm², and the extruded filament could be stretched to 20 folds as long at a stretching rate of 100%/sec. The stretched product was a satisfactory porous product having a uniform appearance.

EXAMPLE 7

Example 6 was repeated except that 20 mg of potassium thiocyanate was used in place of ammonium thiocyanate.

The resulting polymer dispersion had a concentration of 19.6%, and the powder produced therefrom had an average particle size of 0.25 micron, an S.G. of 2.185, a molecular weight of 5,600,000 and an A.I. of 0.075. The power had a melting point by DSC of 347° C. (620° K.), an endothermic ratio of 0.19 and a half value width of the endothermic peak of 4.2 degrees.

The pressure in paste extrusion was 142 kg/cm², and the extruded filament could be stretched to 20 folds as long at a stretching rate of 100%/sec to obtain a satisfactory porous product.

Reference Example 3

Example 6 was repeated except that the amount of APS (polymerization initiator) was increased to 25 mg.

The resulting polymer dispersion had a concentration of 24.5%, and the powder produced therefrom had an average particle size of 0.21 micron, an S.G. of 2,200, a molecular weight of 3,900,000 and an A.I. of 0.101. The powder showed a melting point by DSC of 347° C. (620° K.), an endothermic ratio of 0.4 and a half value width of the endothermic peak of 5 degrees.

The pressure in paste extrusion was 150 kg/cm², and the extruded filament was broken by stretching at a rate of 100%/sec.

EXAMPLE 8

In the same manner as in Reference Example 1, the polymerization was started except that the temperature in the system was fixed at 70° C. When the yield of the polymer reached 60–65% of the final yield, the temperature in the system was dropped from 70° C. to 60° C., and the polymerization was continued at 60° C., until the end thereof. It was confirmed that the polymerization rate at the time when the yield of the polymer reached to 70% of the final yield was about 15% lower than when the polymerization was continued at 70° C. to obtain the same yield of the polymer.

The resulting PTFE dispersion has a concentration of 18.5%, and the powder obtained therefrom had an average particle size of 0.29 micron, an S.G. of 2.175, a molecular weight of 7,000,000 and an A.I. of 0.086. The melting diagram of the powder by DSC showed a peak at 347° C. (620° K.), and the endothermic ratio was 0.17 and the half value width of the endothermic peak was 4 degrees. The extrusion pressure in paste extrusion was 190 kg/cm², and the extruded filament could be stretched at a stretching rate of 100%/sec.

Reference Example 4

With respect to various commercially available PTEF fine powders as shown in Table 3, there were measured the molecular weight, A.I. value, and melting characteristics by DSC, and further, they were subjected to the paste extrusion test and the stretching test. The results are shown in Table 3.

Figure 5:
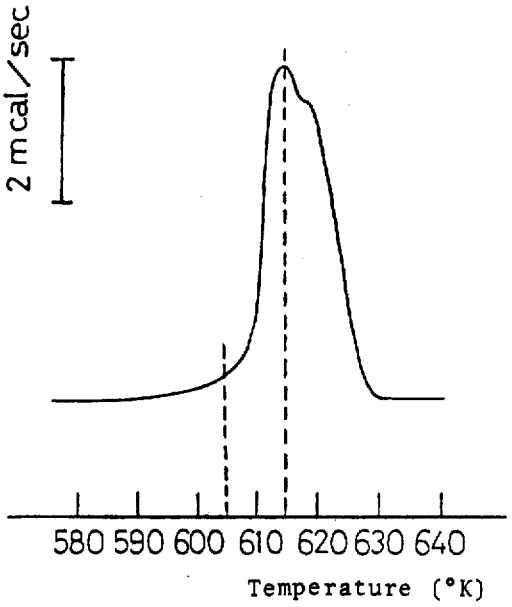
Figure 6:
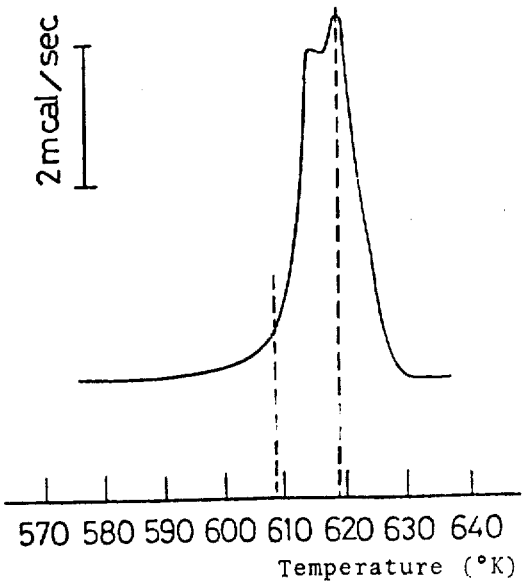
Figure 7:
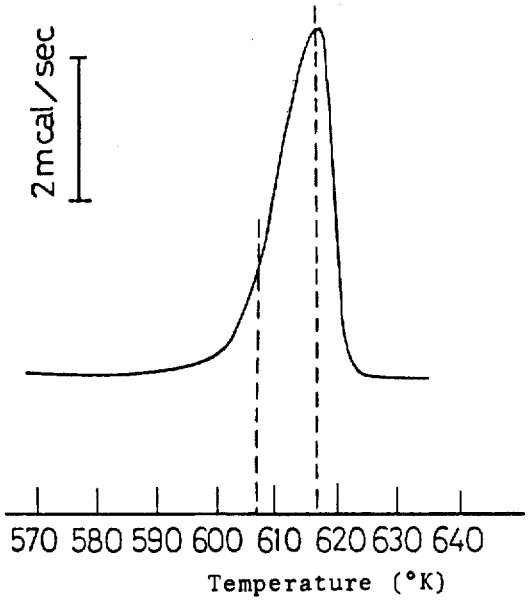
Figure 8:
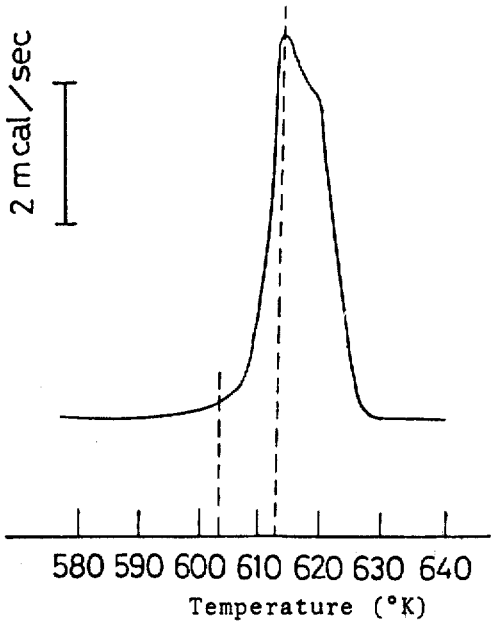

Besides, the melting diagrams of these commercial products by DSC are shown in FIGS. 5 to 8, wherein FIG. 5 is of Hostaflon VP-22, FIG. 6 is of Fluon CD-1, FIG. 7 is of Soreflon 6–20, and FIG. 8 is of Teflon 6J.

TABLE 3

| Powder | S.G. | Molecular weight | A.I. | Average particle size (μ) | DSC analysis: Temp. of endothermic peak (°C.) | DSC analysis: Endothermic ratio | DSC analysis: Half value width of endothermic peak (degree) | Extrusion pressure in paste extrusion test (kg/cm²) | Stretchability |
|---|---|---|---|---|---|---|---|---|---|
| Hostaflon VP-22 | 2.229 | $2.0 \times 10^6$ | 0.131 | 0.26[a] | 341 | — | 12.0 | 180 | Broken at 1000%/sec |
| Fluon CD-1 | 2.223 | $2.3 \times 10^6$ | 0.078 | 0.20[a] | 340.5 | 0.16 | 10.5 | 185 | " |
| Fluon CD-123 | 2.185 | $5.6 \times 10^6$ | 0.067 | — | 345 | 0.33 | 8.5 | 172 | Broken at 100%/sec |
| Sereflon 6-20 | 2.183 | $5.8 \times 10^6$ | 0.087 | — | 343 | 0.29 | 10.5 | 192 | " |
| Teflon 6J | 2.213 | $2.9 \times 10^6$ | 0.091 | 0.24[a] | 340 | — | 10.0 | 111 | Broken at 1000%/sec |
| Teflon 6CJ | 2.178 | $6.5 \times 10^6$ | 0.139 | 0.22[a] | 347 | 0.22 | 6.0 | 107 | " |
| Polyflon F-101 | 2.186 | $5.6 \times 10^6$ | 0.122 | 0.41 | 340.5 | — | 12.0 | 181 | " |
| Polyflon F-104E | 2.206 | $3.8 \times 10^6$ | 0.094 | 0.25 | 344 | 0.41 | 9.5 | 154 | Broken at 100%/sec |

[[Note]:
[a]The powder was irradiated with radiant rays of $5 \times 10^8$ rad in order to deagglomerate the powder, and then the particle size thereof was measured by an electron microscope.

What is claimed is:

1. A polytetrafluoroethylene fine powder which has an average molecular weight of not less than 5,000,000, an amorphous index of not more than 0.1 and a sharp endothermic peak at a temperature between 343° C. and 350° C. on the melting diagram by a differential scanning calorimeter, said sharp peak having an endothermic ratio of not more than 0.3 and a half value width of the endothermic peak of not more than 8 degrees.

2. The polytetrafluoroethylene fine powder according to claim 1, wherein the average molecular weight is not less than 5,500,000.

3. The polytetrafluoroethylene fine powder according to claim 1, wherein the endothermic peak on the melting diagram by a differential scanning calorimeter appears in the region of 345° to 349° C.

4. The polytetrafluoroethylene fine powder according to claim 1, wherein the endothermic ratio is not more than 0.27.

5. The polytetrafluoroethylene fine powder according to claim 1, wherein the half value width of the endothermic peak is not more than 6 degrees.

6. In a process for producing a polytetrafluoroethylene fine powder, which has an average molecular weight of not less than 5,000,000, an amorphous index of not more than 0.1 and a sharp endothermic peak at a temperature between 343° C. and 350° C. on the melting diagram by a differential scanning calorimeter, said sharp peak having an endothermic ratio of not more than 0.3 and a half value width of the endothermic peak of not more than 8 degrees, the polymerization reaction at a polymerization temperature of 55° to 86° C. using a water-soluble persulfate as the polymerization initiator in a concentration of 0.002% by weight or less, and changing the polymerization condition after the initiation of polymerization and after the polymer in an amount of at least 25% by weight of the final yield is produced but before at most 85% by weight of the final yield of the polymer is produced, said changing of the polymerization condition being carried out by adding either or both of an alkali and a radical scavenger to the polymerization system or by lowering the polymerization temperature 5° to 30° C. said alkali being added in such an amount that the polymerization system is kept on an alkaline side and said radical scavenger being added in an amount of about 2 to 5 times by weight of the amount of the polymerization initiator.

7. The process according to claim 6, wherein the changing of the polymerization condition is carried out by adding an alkali to the polymerization system.

8. The process according to claim 7, wherein the addition of the alkali is done after the polymer in an amount of at least 30% by weight of the final yield is produced and before at most 80% by weight of the final yield of the polymer is produced.

9. The process according to claim 6, wherein the changing of the polymerization condition is carried out by adding a radical scavenger to the polymerization system in an amount of about 2 to 5 times by weight of the amount of the polymerization initiator, said radical scavenger being effective on radicals in the aqueous phase.

10. The process according to claim 9, wherein the addition of a radical scavenger is done after the polymer in an amount of at least 30% by weight of the final yield is produced and before at most 80% by weight of the final yield of the polymer is produced.

11. The process according to claim 6, wherein the changing of the polymerization condition is carried out by lowering the polymerization temperature at least 5° C., but not more than 30° C.

12. The process according to claim 11, wherein the temperature is lowered at least 10° C.

* * * * *